No. 873,801. PATENTED DEC. 17, 1907.
S. A. SIZEMORE.
SWIVEL FOR ROCK DRILLS.
APPLICATION FILED MAY 14, 1907.
2 SHEETS—SHEET 2.
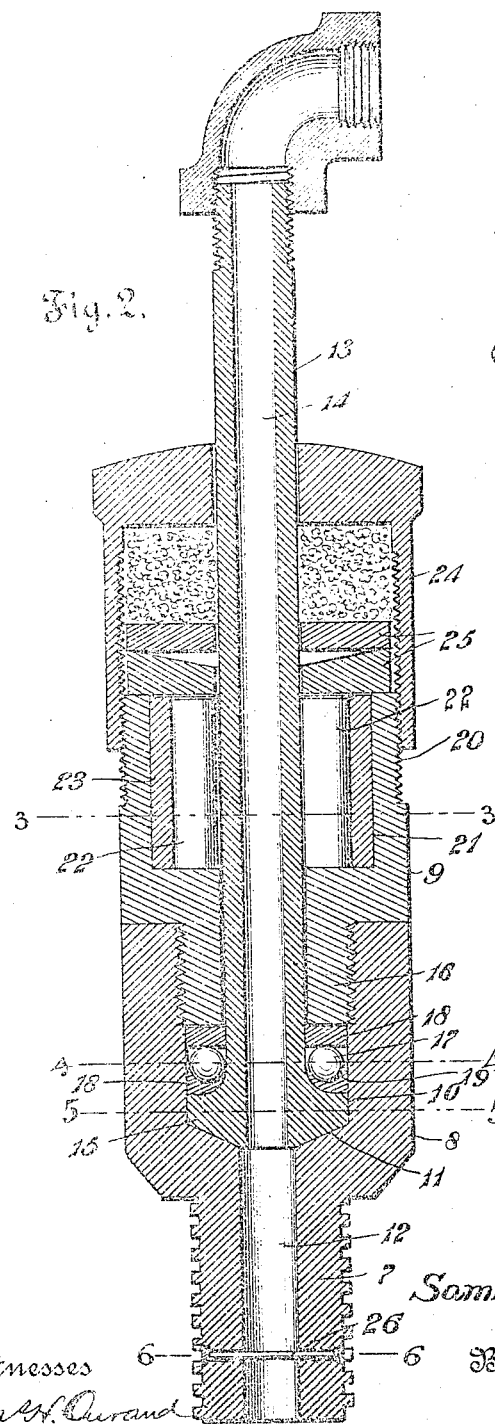
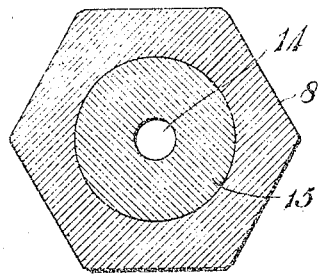
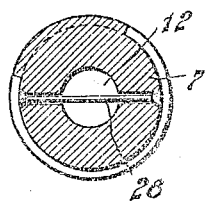
Samuel A. Sizemore, Inventor
Witnesses
By
Attorney

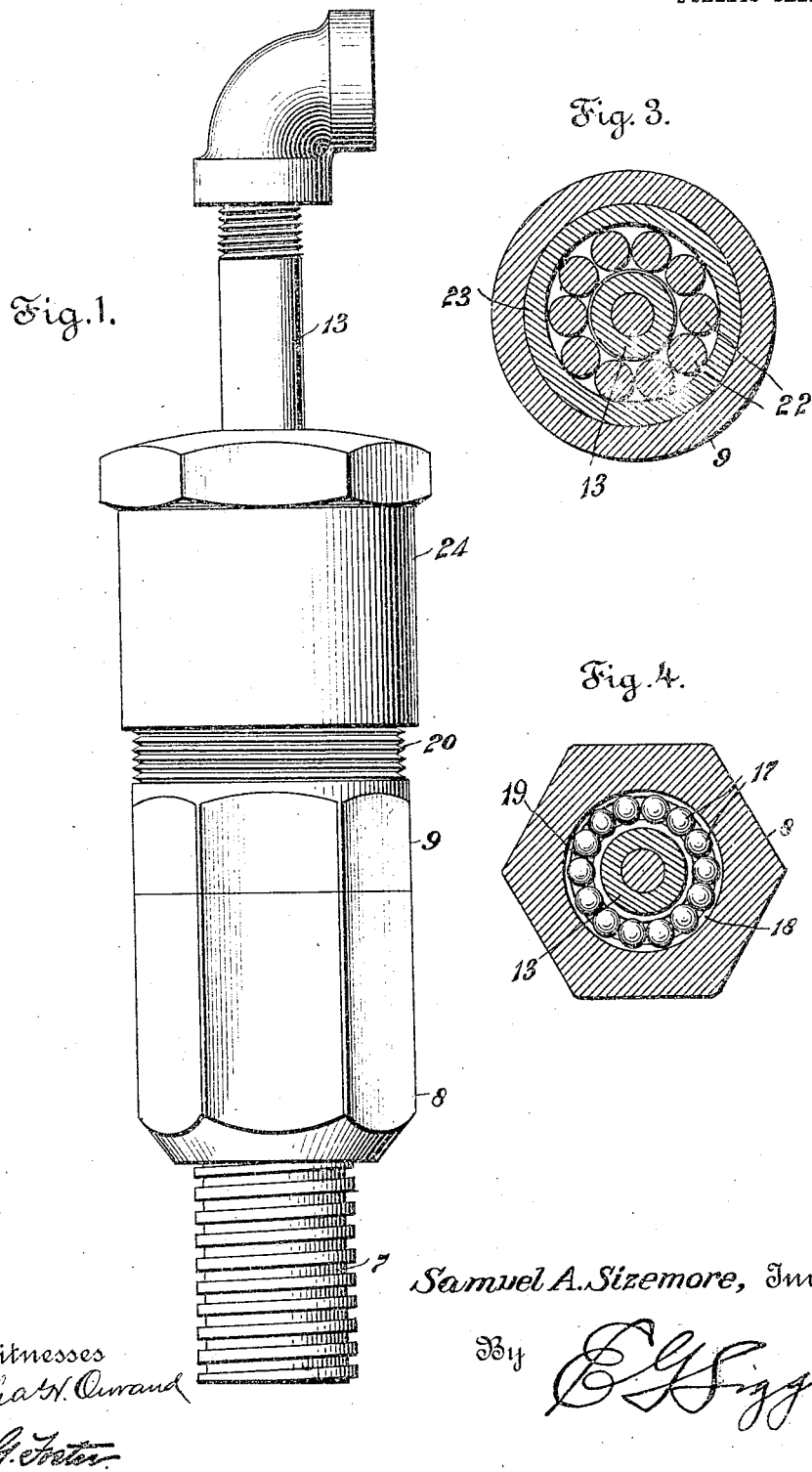

UNITED STATES PATENT OFFICE.

SAMUEL ALEXANDER SIZEMORE, OF LEADWOOD, MISSOURI.

SWIVEL FOR ROCK-DRILLS.

No. 873,801.  Specification of Letters Patent.  Patented Dec. 17, 1907.

Application filed May 14, 1907. Serial No. 373,923.

*To all whom it may concern:*

Be it known that I, SAMUEL ALEXANDER SIZEMORE, a citizen of the United States, residing at Leadwood, in the county of St. Francois and State of Missouri, have invented a new and useful Swivel for Rock-Drills, of which the following is a specification.

This invention, while relating more particularly to the so-called water heads or swivels, employed in connection with diamond drills, is capable of advantageous use in other analogous relations.

The principal object is to provide a novel and simple structure of the above character, wherein the friction between the relatively rotatable parts or members is reduced to a minimum without affecting the necessary tightness of the joint between them, said structure not only eliminating the friction due to the longitudinal strain between the members, but also avoiding to a very material degree, the friction caused by the lateral strain due to the weight of the hose pipe at one side of the coupling.

While the invention may be embodied in a number of ways, the preferred form of structure is illustrated in the accompanying drawings, wherein:—

Figure 1 is a side elevation of the swivel. Fig. 2 is a longitudinal sectional view therethrough. Fig. 3 is a cross sectional view on the line 3—3 of Fig. 2. Fig. 4 is a cross sectional view on the line 4—4 of Fig. 2. Fig. 5 is a cross sectional view on the line 5—5 of Fig. 2. Fig. 6 is a cross sectional view on the line 6—6 of Fig. 2.

Similar reference numerals designate corresponding parts in all the figures of the drawings.

In the embodiment illustrated, a tubular member 7 is employed that is provided with a head, comprising sections 8 and 9. The section 8 is made integral with the member 7, and has a socket 10, the inner or lower end 11 of which is beveled, as shown. The longitudinal bore 12 of the member communicates with the central portion of the socket. A supply member 13, with which the member 7 is rotatably associated, is in the form of a pipe having a bore 14 therethrough communicating with the bore 12 of the member 7. Said member 13 is provided at its lower end with an enlargement 15 that is fitted in the socket 5, and has its lower end tapered to correspond to the inner end 11 of said socket.

The head section 9 surrounds the member 13, and has a plug 16 that is threaded into the upper portion of the socket 12 above the enlargement 15. An antifriction bearing is interposed between said enlargement and the inner end of the plug 16. In the present embodiment, this bearing consists of an annular series of balls 17 interposed between a pair of bearing plates 18, the upper plate being associated with the lower end of the plug 16, the lower plate bearing against the upper side of the enlargement 15, said lower plate having an annular channel or race 19. The plug or head section 9 is of the same cross sectional area as the section 8, and these two sections are angular in cross section in order to permit their being readily turned by a spanner or wrench. The upper portion of the section 9 is exteriorly threaded, as shown at 20. This section is furthermore provided in its upper portion with a socket 21, and in the socket is formed another antifriction bearing, comprising an annular series of upright rollers 22 disposed longitudinally of and surrounding the member 13, which passes through the socket. A bearing sleeve 23 may be disposed outside the rollers.

The rollers are held in place by a packing gland comprising a cup 24, surrounding the member 13, and screwed upon the threaded portion 20 of the section 9. Within this cup are located one or more disks, as 25, which rest upon the upper end of the section. Extending across the bore 12 of the lower member 7 and below the bearings is a stop pin 26, which permits the free passage of fluid, but prohibits the passage of the balls, should the same from any cause, enter the bore 12.

It will be observed that in this structure, the bearing surfaces of the balls and rollers are disposed in angular relation, that is to say, the bearing surfaces of the balls are disposed transversely of the axis of rotation of the members, while the bearing surfaces of the rollers are located longitudinally thereof. It will also be observed that sufficient room is left between the member 13 and the parts through which it passes to permit slight lateral play thereof, so that upon the lateral movement of the member 13, it will be brought to bear against the rollers. By this arrangement, therefore, the longitudinal strain between the members is transmitted through the ball bearings, while the lateral strain due to the weight of the hose pipe upon the member 13 is brought against the rollers. Therefore it will be evident that friction between the relatively rotatable members is reduced to a minimum, eliminating very considerably the wearing of the parts. At the same time, the structure is exceedingly simple, as will be evident, and the tightness of the joint is not materially affected. The use of the stop pin is advantageous, for should the parts break to release the rollers, they will not pass downwardly through the bore into the drill.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new, and desire to secure by Letters Patent, is:—

1. In a swivel of the character described, the combination with relatively rotatable members, of an antifriction bearing interposed between the members for taking the longitudinal strain between them, and another antifriction bearing interposed between the members and receiving the lateral strain between said members.

2. In a swivel of the character described, the combination with relatively rotatable members, of an antifriction bearing interposed between the members for taking the longitudinal strain between them, and another antifriction bearing interposed between the members and receiving the lateral strain between said members, one of said bearings comprising rollers, the other comprising balls.

3. In a swivel of the character described, the combination with relatively rotatable members, of an antifriction bearing comprising balls that are interposed between the members for taking the longitudinal strain between them, and another antifriction bearing comprising an annular series of longitudinally disposed rollers interposed between the members and receiving the lateral strain between them.

4. In a swivel of the character described, the combination with relatively rotatable members, of an antifriction bearing interposed between the members for taking the longitudinal strain between them, and another antifriction bearing interposed between the members and receiving the lateral strain between said members, said bearings having their bearing portions disposed in angular relation.

5. In a swivel of the character described, the combination with relatively rotatable members, of an antifriction bearing interposed between the members and having its bearing surfaces disposed transversely of their axis of rotation, and another antifriction bearing interposed between the members and having their bearing surfaces disposed longitudinally of said members.

6. In a swivel of the character described, the combination with relatively rotatable tubular members disposed in substantial alinement, one of said members having a head that surrounds the other, of an antifriction bearing interposed between the head and said other member, and having bearing surfaces disposed transversely thereof, and another antifriction bearing interposed between the head and other bearing member and having its bearing surfaces disposed longitudinally thereof.

7. In a swivel of the character described, the combination with relatively rotatable tubular members, one of said members having a head that surrounds the other, of a ball bearing interposed between the head and said other member and having bearing surfaces disposed transversely thereof, a roller bearing interposed between the head and other member, said rollers being disposed longitudinally thereof.

8. In a swivel of the character described, the combination with a tubular member having a socket, of another tubular member having an enlarged terminal portion fitted in the socket, a plug threaded into the socket at one end of the enlargement and having an angular portion and an exteriorly threaded portion, a ball bearing interposed between the inner portion of the plug, and the enlargement, and a packing gland including a cup threaded on the exterior of the plug.

9. In a swivel of the character described, the combination with a tubular member having a head, of another tubular member journaled in the head and communicating with the first mentioned member, and an antifriction bearing interposed between the head and portion of the member located therein and having its bearing surfaces disposed longitudinally thereof.

10. In a swivel of the character described, the combination with a tubular member having a head, of another tubular member journaled in the head and communicating with the first mentioned member, and rollers interposed between the head and portion of the member located therein, said rollers being disposed longitudinally of the members.

11. In a swivel of the character described, the combination with a tubular member having a head that is provided with a socket, of a second member rotatably connected to the first member and passing through the socket, a plurality of rollers located in the socket and disposed longitudinally of the second member, and means for retaining the rollers in the socket.

12. In a swivel of the character described, the combination with a tubular member having a head that is provided with a socket, of a second member rotatably connected to the first member and passing through the socket, a plurality of rollers located in the socket and disposed longitudinally of the second member, and a packing gland secured to the head and constituting retaining means for the rollers.

13. In a swivel of the character described, the combination with a member having a sectional head, of a second member having a rotatable bearing in one section of the head, the other section constituting retaining means for the bearing, and a second bearing located in said other section and comprising antifriction devices surrounding the second member.

14. In a swivel of the character described, the combination with a member having a sectional head, of a second member having a rotatable bearing in one section of the head, the other section constituting retaining means for the bearing, a second bearing located in said other section and comprising antifriction devices surrounding the second member, and a packing gland secured to said other section and constituting retaining means for the antifriction devices.

15. In a swivel of the character described, the combination with a member having a head section provided with a socket, of a second member rotatably journaled in the socket, antifriction means located in the socket, another section secured to the first section, and having a socket through which the second member rotatably passes, and antifriction means located in the socket of the second section.

16. In a swivel of the character described, the combination with a member having a head section provided with a socket, of a second member rotatably journaled in the socket, antifriction means located in the socket, a plug section secured in the socket of the first section and having a socket through which the second member rotatably passes, antifriction means located in the socket of the second section, and retaining means secured to the second section.

17. In a swivel of the character described, the combination with a tubular member having a head section that is provided with a socket, of a second tubular member having an enlarged portion rotatably mounted in the socket, said members being in communication, a plug section detachably fitted in the socket of the head section, ball bearings interposed between the plug section and the enlarged portion of the second tubular member, said plug section also having a socket through which the second tubular member rotatably passes, rollers surrounding the second member and located in the socket of the plug section, said rollers being disposed longitudinally of the members, and a packing gland detachably secured to the plug section and constituting a closure for the socket thereof.

18. In a swivel of the character described, the combination with a lower tubular member, of an upper tubular member rotatably connected thereto, antifriction bearing devices interposed between portions of the members, and a stop extending across the bore of the lower member below said antifriction devices.

19. In a swivel of the character described, the combination with a lower tubular member, of an upper tubular member rotatably connected thereto, antifriction balls interposed between portions of the members, and a stop pin extending across the bore of the lower member below said antifriction balls.

In testimony, that I claim the foregoing as my own, I have hereto affixed my signature in the presence of two witnesses.

SAMUEL ALEXANDER SIZEMORE.

Witnesses:
  JASPER NEWTON BURKS,
  WM. MURRAY.